(12) United States Patent
Kelley et al.

(10) Patent No.: US 7,754,361 B2
(45) Date of Patent: Jul. 13, 2010

(54) FUEL CELL SYSTEMS WITH MAINTENANCE HYDRATION BY DISPLACEMENT OF PRIMARY POWER

(75) Inventors: Mason P. Kelley, Redmond, OR (US); Arne Laven, Bend, OR (US); Tod L. Snider, Bend, OR (US)

(73) Assignee: Idatech, LLC, Bend, OR (US)

( * ) Notice: Subject to any disclaimer, the term of this patent is extended or adjusted under 35 U.S.C. 154(b) by 623 days.

(21) Appl. No.: 11/755,227

(22) Filed: May 30, 2007

(65) Prior Publication Data

US 2008/0299420 A1  Dec. 4, 2008

(51) Int. Cl.
 *H01M 8/04* (2006.01)
(52) U.S. Cl. .............................. 429/13; 429/23; 307/64
(58) Field of Classification Search .................... 429/13, 429/22, 23; 307/64
See application file for complete search history.

(56) References Cited

U.S. PATENT DOCUMENTS

| | | | |
|---|---|---|---|
| 2,824,620 | A | 2/1958 | De Rosset |
| 3,336,730 | A | 8/1967 | McBride et al. |
| 3,338,681 | A | 8/1967 | Kordesch |
| 3,350,176 | A | 10/1967 | Green et al. |
| 3,469,944 | A | 9/1969 | Bocard et al. |
| 3,522,019 | A | 7/1970 | Buswell et al. |
| 3,655,448 | A | 4/1972 | Setzer |

(Continued)

FOREIGN PATENT DOCUMENTS

EP  1065741 A2  1/2001

(Continued)

OTHER PUBLICATIONS

English-language abstract of German language PCT Patent Application Serial No. WO 97/43796, (doc date Nov. 1997).

(Continued)

*Primary Examiner*—Stephen J. Kalafut
(74) *Attorney, Agent, or Firm*—Dascenzo Intellectual Property Law, P.C.

(57) ABSTRACT

Fuel cell systems that perform maintenance hydration by supplying power to satisfy at least part of an applied load from an energy-consuming assembly while a primary power source is in electrical communication with and available to supply power to the energy-consuming assembly to satisfy the portion of the applied load being satisfied by the fuel cell system. In some embodiments, a fuel cell system may determine a start time, or start condition, for maintenance of the fuel cell system. The fuel cell system then may be activated from an inactive condition according to the start time, or start condition, by initiating delivery of at least fuel, and optionally oxidant, to a fuel cell stack of the system. Power then may be supplied from the activated fuel cell system at an output voltage that is higher than a voltage at which power from the primary power source is being supplied, such that the applied load is satisfied, at least in part, by the power from the fuel cell system instead of the power from the primary power source. Upon operation of the fuel cell system for a period sufficient to rehydrate the fuel cell stack, operation of the fuel cell system may be discontinued, with the primary power source resuming supplying power to satisfy the applied load from the energy-consuming assembly.

30 Claims, 5 Drawing Sheets

U.S. PATENT DOCUMENTS

| | | |
|---|---|---|
| 3,857,735 A | 12/1974 | Louis et al. |
| 3,877,989 A | 4/1975 | Walman et al. |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,349,613 A | 9/1982 | Winsel |
| 4,468,235 A | 8/1984 | Hill |
| 4,642,273 A | 2/1987 | Sasaki |
| 4,657,828 A | 4/1987 | Tajima |
| 4,820,594 A | 4/1989 | Sugita et al. |
| 4,904,548 A | 2/1990 | Tajima |
| 5,006,846 A | 4/1991 | Granville et al. |
| 5,200,278 A | 4/1993 | Watkins |
| 5,229,222 A | 7/1993 | Tsutsumi et al. |
| 5,366,818 A | 11/1994 | Wilkinson et al. |
| 5,366,821 A | 11/1994 | Merritt et al. |
| 5,401,589 A | 3/1995 | Palmer et al. |
| 5,432,710 A | 7/1995 | Ishimaru et al. |
| 5,478,662 A | 12/1995 | Strasser |
| 5,527,632 A | 6/1996 | Gardner |
| 5,624,768 A | 4/1997 | Tanokura |
| 5,637,414 A | 6/1997 | Inoue et al. |
| 5,658,681 A | 8/1997 | Sato et al. |
| 5,677,073 A | 10/1997 | Kawatsu |
| 5,712,052 A | 1/1998 | Kawatsu |
| 5,763,113 A | 6/1998 | Meltser et al. |
| 5,771,476 A | 6/1998 | Mufford et al. |
| 5,795,666 A | 8/1998 | Johnssen |
| 5,798,186 A | 8/1998 | Fletcher et al. |
| 5,861,137 A | 1/1999 | Edlund |
| RE36,148 E | 3/1999 | Strasser |
| 5,897,766 A | 4/1999 | Kawatsu |
| 5,897,970 A | 4/1999 | Isomura et al. |
| 5,927,416 A | 7/1999 | del Re et al. |
| 5,929,538 A | 7/1999 | O'Sullivan et al. |
| 5,964,309 A | 10/1999 | Kimura et al. |
| 5,985,474 A | 11/1999 | Chen et al. |
| 5,989,739 A | 11/1999 | Zur Megede et al. |
| 5,991,670 A | 11/1999 | Mufford et al. |
| 5,997,594 A | 12/1999 | Edlund et al. |
| 6,007,931 A | 12/1999 | Fuller et al. |
| 6,011,324 A | 1/2000 | Kohlstruck et al. |
| 6,067,482 A | 5/2000 | Shapiro |
| 6,083,637 A | 7/2000 | Walz et al. |
| 6,084,318 A | 7/2000 | Mardirossian |
| 6,103,410 A | 8/2000 | Fuller et al. |
| 6,146,780 A | 11/2000 | Cisar et al. |
| 6,165,633 A | 12/2000 | Negishi |
| 6,183,914 B1 | 2/2001 | Yao et al. |
| 6,207,312 B1 * | 3/2001 | Wynne et al. ............. 429/13 X |
| 6,214,484 B1 | 4/2001 | Hauer |
| 6,221,117 B1 | 4/2001 | Edlund et al. |
| 6,242,120 B1 | 6/2001 | Herron |
| 6,376,113 B1 | 4/2002 | Edlund et al. |
| 6,379,826 B1 | 4/2002 | Lacy |
| 6,383,670 B1 | 5/2002 | Edlund et al. |
| 6,387,556 B1 | 5/2002 | Fuglevand et al. |
| 6,451,464 B1 | 9/2002 | Edlund et al. |
| 6,465,118 B1 | 10/2002 | Dickman et al. |
| 6,479,177 B1 | 11/2002 | Roberts et al. |
| 6,495,277 B1 | 12/2002 | Edlund et al. |
| 6,522,955 B1 | 2/2003 | Colborn |
| 6,569,227 B2 | 5/2003 | Edlund et al. |
| 6,583,521 B1 | 6/2003 | Lagod et al. |
| 6,764,782 B2 | 7/2004 | Raiser et al. |
| 6,764,785 B2 | 7/2004 | Colborn et al. |
| 6,835,481 B2 | 12/2004 | Dickman et al. |
| 6,902,837 B2 | 6/2005 | McCluskey et al. |
| 6,960,400 B2 | 11/2005 | Hara et al. |
| 7,026,065 B2 | 4/2006 | Ballantine et al. |
| 7,060,379 B2 | 6/2006 | Speranza et al. |
| 2001/0049038 A1 | 12/2001 | Dickman et al. |
| 2002/0114984 A1 | 8/2002 | Edlund et al. |
| 2002/0169523 A1 | 11/2002 | Ross et al. |
| 2002/0182467 A1 | 12/2002 | Ballantine et al. |
| 2002/0192516 A1 | 12/2002 | Tajima |
| 2003/0064262 A1 | 4/2003 | Ballantine et al. |
| 2003/0072977 A1 | 4/2003 | Speranza et al. |
| 2003/0087139 A1 | 5/2003 | White |
| 2003/0176951 A1 | 9/2003 | DeMarchi et al. |
| 2003/0215677 A1 | 11/2003 | Frost et al. |
| 2004/0081867 A1 | 4/2004 | Edlund |
| 2008/0050621 A1 * | 2/2008 | Lai ............................ 429/13 |
| 2008/0299423 A1 * | 12/2008 | LaVen ...................... 429/22 X |

FOREIGN PATENT DOCUMENTS

| | | |
|---|---|---|
| JP | 4-163860 | 6/1992 |
| WO | WO 00/02282 | 1/2000 |

OTHER PUBLICATIONS

English-language abstract of Japanese Patent No. JP 4-163860, (Jun. 1992).

* cited by examiner

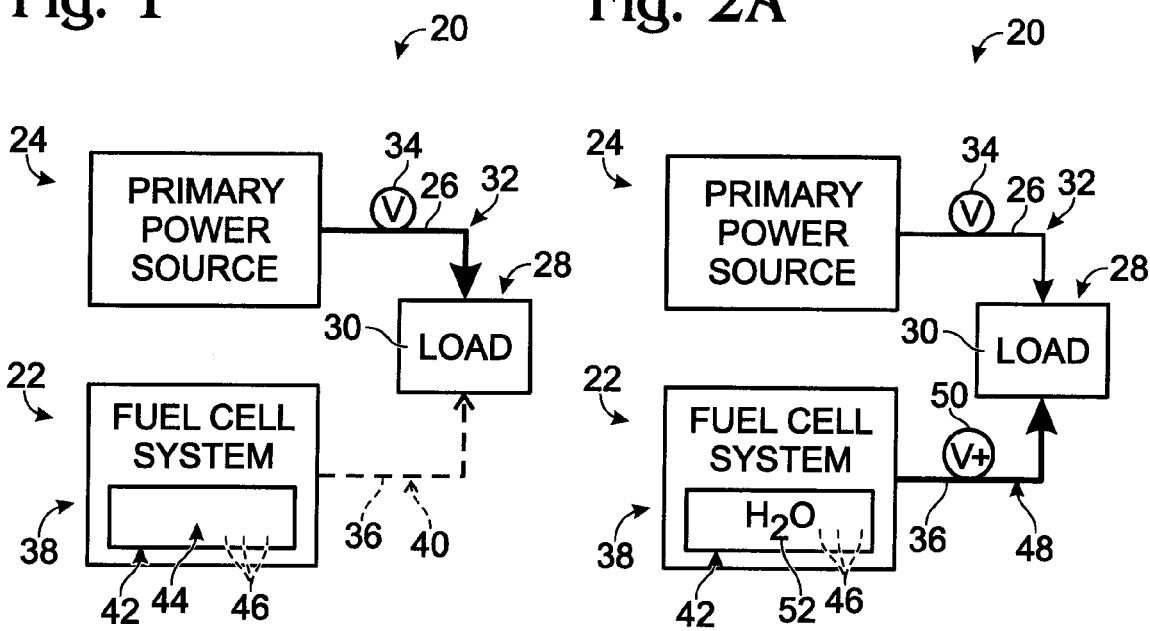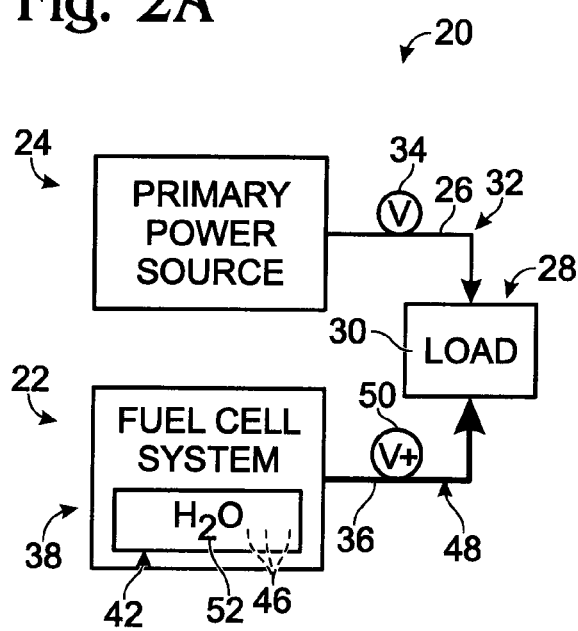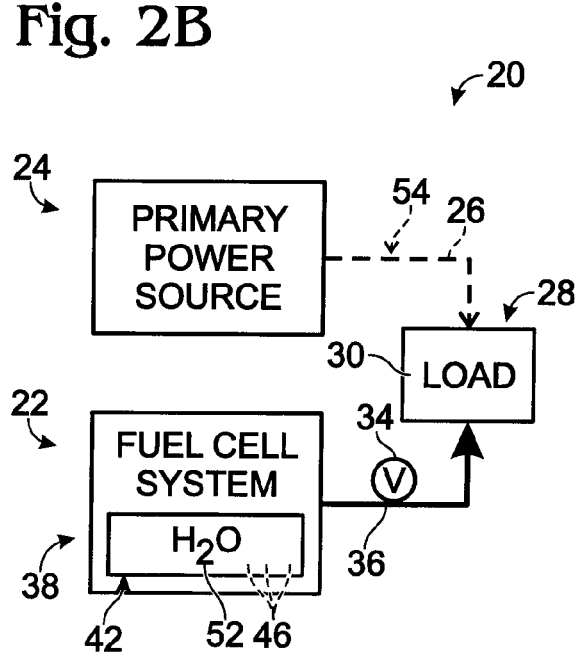

FUEL CELL SYSTEMS WITH MAINTENANCE HYDRATION BY DISPLACEMENT OF PRIMARY POWER

FIELD OF THE DISCLOSURE

The present disclosure is directed generally to fuel cell systems, and more particularly to fuel cell systems that perform maintenance hydration by supplying power to satisfy at least part of an applied load from an energy-consuming assembly while a primary power source is in electrical communication with and available to supply power to the energy-consuming assembly.

BACKGROUND OF THE DISCLOSURE

Fuel cell stacks are electrochemical devices that produce water and an electrical potential from a fuel, such as a proton source, and an oxidant. Many conventional fuel cell stacks utilize hydrogen gas as the proton source and oxygen gas, air, or oxygen-enriched air as the oxidant. Fuel cell stacks typically include many fuels cells that are fluidly and electrically coupled together between common end plates. Each fuel cell includes an anode region and a cathode region that are separated by an electrolytic barrier. In some fuel cells, the electrolytic barrier takes the form of an electrolytic membrane. Hydrogen gas is delivered to the anode region, and oxygen gas is delivered to the cathode region. Protons from the hydrogen gas are drawn through the electrolytic barrier to the cathode region, where water is formed. While protons may pass through the electrolytic barrier, electrons cannot. Instead, the electrons that are liberated from hydrogen gas travel through an external circuit to form an electric current.

Fuel cell systems may be designed to be the primary and/or backup power source for an energy-consuming assembly that includes one or more energy-consuming devices. When implemented as a backup, or auxiliary, power source for an energy-consuming assembly, the fuel cell system is utilized during times when the primary power source is unable or unavailable to satisfy some or all of the energy demand, or applied load, of the energy-consuming assembly.

The electrolytic membranes of some fuel cell systems, such as proton exchange membranes (PEM), or solid polymer fuel cell systems, generally need a proper level of hydration to allow the electrolytic membranes to function efficiently for generation of electrical output. During generation of power by a fuel cell system, water for membrane hydration is generated by electrochemical reaction. However, during periods of inactivity, which are common for fuel cell systems that are utilized as an auxiliary (i.e. backup) power supply, the electrolytic membranes have a tendency to dry out as their period of inactivity increases. As a result, the ability of the fuel cell system to reliably and efficiently provide power when needed may be reduced substantially. One approach to maintaining hydration is to connect the fuel cell system to an artificial, or "dummy," load, such as one or more resistors or light assemblies, and then to operate the fuel cell system periodically to supply power to the artificial load. This load-applying structure is referred to as an artificial load because it is present primarily to enable the fuel cell system to generate an electrical output by satisfying the applied load. However, the artificial load increases the size, weight and/or expense of the fuel cell system. Furthermore, other than providing maintenance, powering the artificial load wastes electrical output—and thus fuel—and may generate substantial heat in or near the fuel cell system. Accordingly, new approaches are needed for maintaining the readiness of fuel cell systems serving as backup power sources.

SUMMARY OF THE DISCLOSURE

The present disclosure is directed generally to fuel cell systems, and more particularly to fuel cell systems that perform maintenance hydration by supplying power to satisfy at least part of an applied load from an energy-consuming assembly while a primary power source is in electrical communication with and available to supply power to the energy-consuming assembly to satisfy the portion of the applied load being satisfied by the fuel cell system. In some embodiments, a fuel cell system may determine a start time, or start condition, for maintenance of the fuel cell system. The fuel cell system then may be activated from an inactive condition according to the start time, or start condition, by initiating delivery of at least fuel, and optionally oxidant, to a fuel cell stack of the system. Power then may be supplied from the activated fuel cell system at an output voltage that is higher than a voltage at which power from the primary power source is being supplied, such that the applied load is satisfied, at least in part, by the power from the fuel cell system instead of the power from the primary power source. Upon operation of the fuel cell system for a period sufficient to rehydrate the fuel cell stack, operation of the fuel cell system may be discontinued, with the primary power source resuming supplying power to satisfy the applied load from the energy-consuming assembly.

BRIEF DESCRIPTION OF THE DRAWINGS

FIG. 1 is a schematic view of selected portions of an illustrative power delivery network supplying power from a primary power source to satisfy an applied load of an energy-consuming assembly while a fuel cell system for backup power in the network is inactive, in accordance with aspects of the present disclosure.

FIG. 2A is a schematic view of the illustrative power delivery network of FIG. 1 during maintenance hydration of the fuel cell system, with the fuel cell system supplying power at a voltage sufficient to satisfy at least a portion of the applied load of the energy-consuming assembly while the primary power source is available to supply power to satisfy the portion of the applied load being supplied by the fuel cell system, in accordance with aspects of the present disclosure.

FIG. 2B is a schematic view of the illustrative power delivery network of FIG. 1 during standard operation of the fuel cell system as a backup power source, with the fuel cell system supplying power to satisfy at least a portion of the applied load of the energy-consuming assembly while the primary power source is not available or is supplying insufficient power to satisfy the entire applied load, in accordance with aspects of the present disclosure.

DETAILED DESCRIPTION AND BEST MODE OF THE DISCLOSURE

Figure 3:
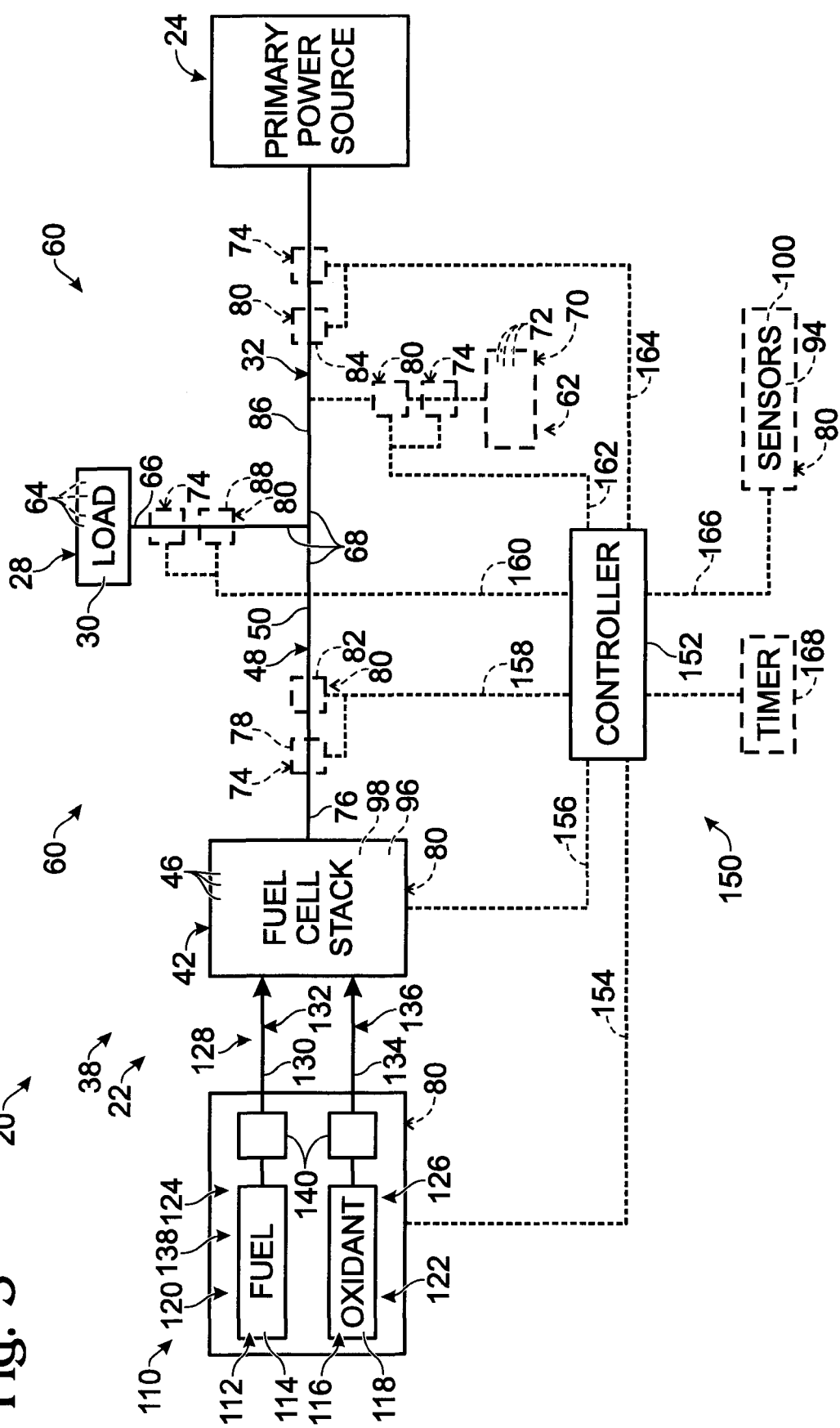
FIG. 3 is another schematic view of the illustrative power delivery network of FIG. 1 showing additional illustrative components, aspects, and features that may be present in the power delivery network, in accordance with aspects of the present disclosure.

The present disclosure is directed to fuel cell systems that perform maintenance hydration by supplying power to satisfy at least part of an applied load of an energy-consuming assembly. The fuel cell system may supply power while a primary power source is in electrical communication with and available for satisfying some or all of the energy needs of the energy-consuming assembly. In particular, the fuel cell system may displace at least a portion of primary power supplied from a primary power source by supplying power to the energy-consuming assembly at a higher voltage than the voltage at which the primary power is being supplied to the energy-consuming assembly. Accordingly, the fuel cell system may be supplying power, which also may be referred to herein as an electrical output, to satisfy at least a portion of an applied load from an energy-consuming assembly while a primary power source, which is nominally configured to satisfy this applied load, is available to satisfy the portion of the applied load being satisfied by the fuel cell system during the maintenance hydration period.

During this maintenance hydration period, the fuel cell system may generate water for maintenance hydration for one or more fuel cell stacks in the fuel cell system as a byproduct of supplying power to the energy-consuming assembly. In some examples, the higher voltage of the fuel cell system may be selected (1) based on an expected or known (e.g., measured) voltage of the primary power source, and/or (2) by increasing the voltage of the fuel cell system until the fuel cell system is generating sufficient electrical output for maintenance hydration to be performed. Fuel cell systems with maintenance hydration according to the present disclosure may (but are not required to) offer substantial advantages over other approaches to maintenance hydration, such as more efficient use of fuel, less generation of heat locally, and/or a smaller increase, if any, in the size/weight of the fuel cell systems, among others.

FIGS. 1, 2A, and 2B show an illustrative power delivery network 20 in which a fuel cell system 22 is inactive (FIG. 1), performing maintenance hydration (FIG. 2A), or providing backup power (FIG. 2B). Power delivery network 20 may include a primary power source 24 in electrical communication, as indicated at 26, with an energy-consuming assembly 28, which applies a load 30 (see FIG. 1). Primary power source 24 may supply primary power 32 to energy-consuming assembly 28 at a voltage 34 (V) to satisfy the applied load, as shown in FIGS. 1 and 2A. Fuel cell system 22 also may be in (and/or switchable into) electrical communication with energy-consuming assembly 28, as indicated at 36.

Fuel cell system 22 may serve as an auxiliary power source 38, which also may be termed a backup power source, for the power delivery network. The fuel cell system thus may not be needed for power generation while the primary power source is operating normally. The fuel cell system thus may generate no power, as indicated at 40 and by a dashed line of electrical communication, if maintenance is not being performed and the primary power source is available and able to satisfy the entire applied load. Accordingly, due to inactivity of the fuel cell system over time, a fuel cell stack 42 of fuel cell system 22 may become dehydrated, schematically indicated at 44 in FIG. 1, as water is lost through evaporation from fuel cells 46 of the fuel cell stack without being replenished by water formed during power generation. Alternatively, or in addition, inactivity of the fuel cell system may reduce efficiency by one or more other mechanisms such as catalytic oxidation and/or poisoning of the fuel cell stack. In any case, over time, the health of the fuel cell system may decline and the system may suffer a loss of performance if the system is not operated periodically.

FIG. 2A shows power delivery network 20 during maintenance operation of fuel cell system 22, particularly maintenance hydration of fuel cell stack 42 of the system. Fuel cell system 22 may supply fuel cell power, or electrical output, 48, by generating an electric current at a voltage 50 (V+) sufficient to satisfy at least a portion of load 30 of energy-consuming assembly 28. In particular, the fuel cell system may supply fuel cell power 48 to the energy-consuming assembly at a higher voltage 50 (V+) then the voltage 34 (V) at which primary power 32 is being supplied to the energy-consuming assembly, such that the fuel cell power supersedes at least a portion of the primary power being supplied to the energy-consuming assembly. Stated differently, the higher voltage of the fuel cell power may cause the energy-consuming assembly to consume fuel cell power in place of or in preference to at least a portion, at least most, and/or at least substantially all of the primary power that was being consumed by the energy-consuming assembly before fuel cell maintenance was initiated and while the primary power source is otherwise available to satisfy this portion of the applied load. As a result, the fuel cell system may generate sufficient power to form water 52 that increases hydration of the fuel cell stack, which may be described as hydrating the fuel cell stack.

FIG. 2B shows power delivery network 20 during standard operation of the fuel cell system 22. With standard operation, the fuel cell system may be providing backup power to satisfy at least a portion or all of the applied load 30 of the energy-consuming assembly 28 while the primary power source is not available or is not supplying sufficient power to satisfy the entire applied load. For example, and as schematically illustrated in FIG. 2B, the primary power source is not available and thus is supplying no power to the energy-consuming assembly, as indicated by a dashed line at 54. When supplying backup power, the fuel cell system 22 may supply power at, for example, the higher voltage 50 (V+) used for maintenance hydration (see FIG. 2A), at the lower voltage 34 (V) at which primary power is typically supplied to the energy-consuming assembly, or at any other suitable voltage.

Power may be supplied to energy-consuming assembly 28 in any suitable form. For example, both the fuel cell system 22 and primary power source 24 may supply power as direct current (DC) or as alternating current (AC). As an illustrative, non-exclusive example, and for the purposes of illustration only, the primary power source may supply DC primary power at a voltage of fifty-four volts and the fuel cell system may override the primary power by supplying DC fuel cell power at a voltage that is greater than fifty-four volts, such as a voltage of fifty-five volts, fifty-six volts, at least fifty-five volts, etc. Overriding the primary power also may be described as displacing or superseding at least a portion of the primary power.

FIG. 3 shows additional illustrative components, aspects, and features that may be, but are not necessarily required to be, included in power delivery network 20. The network may include a fuel cell system 22 according to the present disclosure and also illustrates a non-exclusive example of how fuel cell system 22 may be integrated into a power delivery network and further illustrates additional aspects and features that optionally may be included in fuel cell system 22, whether or not the fuel cell system is being used as a primary or backup power source in power delivery network 20.

Power delivery network 20 may include an energy-consuming assembly 28 and an energy-producing system 60. The energy-producing system may include a primary power source 24, an auxiliary (or backup) power source 38 (e.g., fuel cell system 22), and, optionally, an energy-storage power source 62.

Energy-consuming assembly 28 includes at least one energy-consuming device 64 and is adapted to be powered by energy-producing system 60, for example, by primary power source 24, auxiliary power source 38, and/or energy-storage power source 62. Expressed in slightly different terms, energy-consuming assembly 28 includes at least one energy-consuming device 64 that is in electrical communication with the energy-producing system via load circuit 66. The energy-consuming assembly may be powered by only one power source at a time or may be powered, in part, by two or more power sources at the same time. When powered by two or more power sources at the same time, the collective power output may be delivered to the energy-consuming assembly, optionally with distinct subsets of energy-consuming devices 64 being powered by distinct power sources.

Energy-consuming device(s) 64 may be electrically coupled to primary power source 24, auxiliary power source 38 (fuel cell system 22), and/or to one or more optional energy-storage devices 62 included in power delivery network 20. Device(s) 64 may apply a load 30 to a power source, such as fuel cell system 22, and may draw an electric current from the power source to satisfy the load. This load may be referred to as an applied load, and may include thermal and/or electrical load(s). It is within the scope of the present disclosure that the applied load may be satisfied by the fuel cell system 22, primary power source 24, and/or the energy-storage device 62. Illustrative, non-exclusive examples of energy-consuming devices 64 may include wheeled vehicles (e.g., cars, trucks, recreational vehicles, motorcycles, etc.), on-board vehicle components, aircraft, boats and other sea craft, lights and lighting assemblies, tools, appliances, computers, industrial equipment, signaling and communications equipment, radios, battery chargers, one or more households, one or more residences, one or more commercial offices or buildings, one or more neighborhoods, or any suitable combination thereof, among others.

The energy-consuming assembly is adapted to apply a load to energy-producing system 60. The load typically includes at least one electrical load. The primary power source is (nominally) adapted to satisfy that load (i.e., by providing a sufficient power output to the energy-consuming assembly), and the auxiliary power source is (nominally) adapted to provide a power output to at least partially, if not completely, satisfy the applied load when the primary power source is unable or otherwise unavailable to do so (when the fuel cell system is providing backup power) or is available (when the fuel cell system is performing maintenance). These power outputs may additionally or alternatively be referred to herein as electrical outputs. The power and/or electrical outputs may be described as having a current and a voltage. Although not required, it is within the scope of the present disclosure that the auxiliary power source is adapted to immediately satisfy this applied load upon the primary power source being unable to do so. In other words, it is within the scope of the present disclosure that the auxiliary power source is adapted to provide energy-consuming assembly 28 with an uninterruptible power supply, or an uninterrupted supply of power. By this it is meant that the auxiliary power source may be configured to provide a power output that satisfies the applied load from energy-consuming assembly 28 in situations where the primary power source is not able or available to satisfy this load, with the auxiliary power source being adapted to provide this power output sufficiently fast that the power supply to the energy-consuming assembly is not, or not noticeably, interrupted. By this it is meant that the power output may be provided sufficiently fast that the operation of the energy-consuming assembly is not stopped or otherwise negatively impacted.

The energy-consuming assembly may be disposed in electrical communication with the primary and auxiliary power sources via any suitable power conduit(s), such as schematically represented at 68 in FIG. 3. The primary power source and auxiliary power source may be described as having electrical buses in communication with each other and the energy-consuming assembly.

Energy-consuming assembly 28 may be adapted to be primarily, or principally, powered by primary power source 24. Primary power source 24 may be any suitable source of a suitable power output 32 for satisfying the applied load from the energy-consuming assembly. For example, primary power source 24 may include, correspond to, or be part of an electrical utility grid, another fuel cell system, a solar power system, a wind power system, a nuclear power system, a turbine-based power system, a hydroelectric power system, etc.

FIG. 3 schematically depicts that power delivery network 20 may, but is not required to, include at least one energy-storage device 62, such as a battery assembly 70 of one or more batteries 72. The battery assembly may include any suitable type and number of cells, such as a plurality of batteries or cells arranged in series or in parallel, and may be referred to as a battery assembly that includes at least one battery 72 and an optional battery charger. When battery assembly 70 includes two or more batteries, the battery assembly may include, or be in electrical communication with, a rectifier or other suitable device for equalizing and/or normalizing the charge and/or electrical output of the batteries.

Energy-storage device 62, when included, may be adapted to store at least a portion of the electrical output, or power output, 48 from fuel cell stack 42 of fuel cell system 22 or the power from the primary power source, such as to charge the batteries and/or equalize charges among and/or between batteries. Illustrative, non-exclusive examples of other suitable energy-storage devices that may be used in place of or in combination with one or more batteries include capacitors, ultracapacitors, and/or supercapacitors. Another illustrative example is a fly wheel. Energy-storage device 62 may be configured to provide power to energy-consuming devices 64, such as to satisfy an applied load therefrom, when the fuel cell stack is not able to do so or when the fuel cell stack is not able to completely satisfy the applied load. Energy-storage device 62 may additionally or alternatively be used to power the fuel cell system 22 during start-up of the fuel cell system.

Power delivery network 20 may, but is not required to, include at least one power-management module 74. Power-management module 74 includes any suitable structure or device(s) for conditioning or otherwise regulating the electrical output produced by primary power source 24, auxiliary power source 38, and/or energy-storage power source 62, and/or being delivered to/from energy-consuming devices 64. Power-management module 74 may include such illustrative devices as buck and/or boost converters, rectifiers, inverters, power filters, relays, switches, or any combination thereof, among others. In some embodiments, the power delivery network may include at least one power-management module 74 operatively coupled to an output circuit 76 of the fuel cell system and including a voltage adjustment mechanism 78 for changing the output voltage 50 at which the fuel cell system is supplying (or attempting to supply) power to energy-consuming assembly 28 and/or energy-storage device 62. As described in more detail below, voltage adjustment mechanism 78 may be coupled to a control system of the fuel cell system, to control operation of the voltage adjustment mechanism.

Power delivery network 20 may, but is not required to, include one or more sensors 80. The sensors 80 may be configured to measure one or more electrical characteristics and/or non-electrical characteristics for any suitable portion of the network or the ambient environment. When present, sensors 80 may include one or more electrical sensors for measuring an electrical characteristic of the power delivery network. For example, the electrical sensor(s) may include an auxiliary output sensor 82 included in and/or operatively coupled to output circuit 76 for measuring an electrical characteristic of the fuel cell output. Alternatively, or in addition, the electrical sensors may include a primary output sensor 84 included in and/or operatively coupled to an output circuit 86 of the primary power source 24 for measuring an electrical characteristic of primary power 32, and/or the electrical sensor(s) may include a load sensor 88 included in and/or operatively coupled to load circuit 66 for measuring an electrical characteristic of the load. The electrical sensor may measure any suitable electrical characteristic and/or combination of electrical characteristics, such as output current, voltage, resistance, impedance, and/or capacitance, among others.

Each electrical sensor is indicated in FIG. 3 as being associated with a power-management module 74. However, although each electrical sensor may be associated with and/or integrated into the power-management module, it is also within the scope of the present disclosure that the electrical sensor may be a discrete device and/or assembly of devices. In addition, the electrical sensor may be positioned in any suitable location with respect to a power-management module 74, such as closer to or farther from a corresponding power source (or the energy-consuming assembly), or may be used without a power-management module 74 in the corresponding circuit (e.g., in the auxiliary, primary, or load circuit).

The power delivery network 20 and/or fuel cell system 22 optionally may include one or more sensors 80 for measuring one or more other characteristics of the network 20, fuel cell system 22, or ambient environment and communicating these values to a controller. For example, sensor 80 may be an ambient temperature sensor 94 for measuring an ambient temperature. Alternatively, or in addition, sensor 80 may be a temperature sensor 96 for measuring a temperature in or near the fuel cell system 22 (e.g., the temperature of the fuel cell stack 42 and/or of reactants (and/or the exhaust) upstream of and/or downstream from the fuel cell stack). Furthermore, sensor 80 may be a hydration sensor 98 in fuel cell stack 42, a humidity sensor 100 for measuring ambient or system humidity, or the like. Illustrative temperature sensors that may be suitable include thermistors, thermocouples, infrared thermometers, electrical resistance thermometers, mercury-in-glass thermometers, silicon bandgap temperature sensors, coulomb blockade thermometers, and the like. Illustrative hydration and/or humidity sensors that may be suitable include hygrometers, impedance sensors (e.g., measuring the impedance of the fuel cell stack or a portion thereof), electrolytic sensors, color indicators, spectroscopic sensors, or the like.

Fuel cell system 22 may include at least one reactant delivery system 110 that is adapted to deliver reactants to the at least one fuel cell stack 42. The fuel cell stack, in turn, is adapted to produce an electric current from reaction of the reactants in fuel cells 46 of the fuel cell stack. The reactants generally include a fuel 112, such as hydrogen gas 114, and an oxidant 116, such as oxygen gas 118 (or air or another oxygen-containing gas that is suitable for use as an oxidant by the fuel cell stack).

Fuel 112 and oxidant 116 may be delivered to the fuel cells 46 in fuel cell stack 42 from at least one fuel source, or fuel supply, 120 and at least one oxidant source, or oxidant supply, 122. The fuel and oxidant may be delivered by the same or separate delivery systems 110. As such, in some embodiments, the fuel cell system may be described as including a reactant delivery system 110 that is adapted to deliver streams of fuel and oxidant from the respective fuel and oxidant supplies, or sources. In some embodiments, the reactant delivery system and/or the fuel cell system may be described as including a fuel delivery system 124 and/or an oxidant delivery system 126. When the fuel is hydrogen gas and the oxidant is air, the fuel delivery system may be referred to as a hydrogen delivery system and the oxidant delivery system may be referred to as an air delivery system.

The reactant delivery system and/or fuel cell system containing the fuel cells to be hydrated may be described as including, and/or being in fluid communication with, a suitable conduit structure, or conduit assembly, 128. Conduit assembly 128 provides at least one fluid conduit through which fuel (such as hydrogen gas) may be delivered from the fuel source to the anode regions of the fuel cell stack, and at least one conduit through which air or other suitable oxidant may be delivered from the oxidant source to the cathode regions of the fuel cell stack.

Furthermore, and as discussed in more detail herein, when it is desirable to hydrate fuel cells in the fuel cell stack after periods of inactivity, the conduit assembly and/or reactant delivery system is selectively adapted to deliver fuel to the anode regions of the fuel cells to be hydrated and oxidant to the cathode regions of the fuel cells to be hydrated. The reactant delivery system and/or conduit assembly may have a power-generating configuration, as schematically illustrated here, with one or more fuel conduits, or fuel lines, 130 that carry a stream 132 of fuel 112 from fuel source 120 to anode regions of the fuel cells, and one or more oxidant conduits, or oxidant lines, 134 that carry a stream 136 of oxidant 116 from oxidant source 122 to the cathode regions of the fuel cells.

Fuel source 120 and oxidant source 122 each may include any suitable mechanism(s) for storing, generating, and/or supplying fuel 112 and oxidant 116. Each source may be a closed system that is hermetically sealed or may be an open system that is open to the ambient atmosphere (such as an air supply that draws air from the ambient atmosphere). If structured as a closed system, the fuel/oxidant source may (but is not required to) include a vessel, such as a tank, for containing the fuel (or a fuel feedstock) or oxidant. The vessel may be capable of withstanding an increased internal pressure, such that the contents of the vessel may be pressurized above atmospheric pressure. The vessel may have any suitable position relative to the fuel cell stack. For example, the vessel may be positioned to provide an internal source, that is, a fuel/oxidant source inside a housing that holds both the vessel and the fuel cell stack, or the vessel may be positioned in a spaced relation to the fuel cell stack to provide an external source. The external source may be nearby, for example, in the same room and/or building or on the same grounds as the fuel cell stack, or the external source may be remote from the fuel cell stack, such as a fuel (or oxidant) source operated by a municipal supplier or a power company.

Oxidant source 122 may include any suitable structure for providing a sufficient quantity of oxidant (e.g., oxygen, air, or other suitable oxidant) to the fuel cell stack at a suitable pressure for use in the fuel cell stack. In some embodiments, the oxidant source may include a drive mechanism for urging oxidant to the fuel cell stack. The drive mechanism may include or be a blower, fan, or other lower pressure source of oxidant. Alternatively, or in addition, the drive mechanism may include or be a compressor, pump, or other source of higher pressure oxidant. In some embodiments, the oxidant source may be adapted to provide oxygen-enriched or nitrogen-depleted air to the fuel cell stack. In some embodiments, air for the fuel cell stack is drawn from the environment proximate the fuel cell stack, and in some embodiments, no drive mechanism is utilized to propel oxidant to the fuel cell stack (e.g., to provide an "open cathode," or "air-breathing," design). Non-exclusive examples of suitable sources 122 of oxygen gas 118 include a pressurized tank of oxygen, oxygen-enriched air, or air; or a fan, compressor, blower or other device for directing ambient air to the cathode regions of the fuel cells in the fuel cell stack.

Fuel source 120 may provide generation and/or storage of the hydrogen gas or other fuel in any suitable form. The fuel may be in a molecular form suitable for use in the fuel cell stack or may be in a precursor form (a feedstock) that is processed to produce the fuel by changing the molecular structure of the precursor form. If stored as fuel rather than as a feedstock, the fuel may be in an unbound form (e.g., as a gas or liquid) that is available on demand or may be in a bound (e.g., adsorbed) form that must be released in order to use the fuel in the fuel cell stack. Examples of suitable fuel sources 120 for hydrogen gas 114 include a pressurized tank, a metal hydride bed or other suitable hydrogen storage device, a chemical hydride (such as a solution of sodium borohydride), and/or a fuel processor or other hydrogen generation assembly 138 that produces a stream containing pure or at least substantially pure hydrogen gas from at least one feedstock.

In some embodiments, the fuel source may include a hydrogen-generation assembly 138 adapted to produce a product hydrogen stream containing hydrogen gas 114 as a majority component. For example, the product stream may contain pure or substantially pure hydrogen gas. The hydrogen generation assembly may include a hydrogen-producing assembly, or fuel processing region, that includes at least one hydrogen-producing region in which hydrogen gas is produced from one or more feedstocks. The hydrogen generation assembly also may include a feedstock delivery system that is adapted to deliver the one or more feedstocks to the hydrogen-producing region in one or more feed streams. The feedstock delivery system may be adapted to deliver the feed stream(s) at a suitable condition and flow rate for producing the desired flow of hydrogen gas therefrom. The feedstock delivery system may receive the feedstocks from a pressurized source and/or may include at least one pump or other suitable propulsion mechanism for selectively delivering the feedstock(s) under pressure to the hydrogen-generation assembly. The hydrogen-producing region may be adapted to produce hydrogen gas as a primary, or majority, reaction product through any suitable chemical process or combination of processes.

Examples of suitable mechanisms for producing hydrogen gas from one or more feed streams include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock may be water. Illustrative, non-exclusive examples of suitable carbon-containing feedstocks include at least one hydrocarbon or alcohol. Illustrative, non-exclusive examples of suitable hydrocarbons include methane, propane, natural gas, diesel, kerosene, gasoline and the like. Illustrative, non-exclusive examples of suitable alcohols include methanol, ethanol, and polyols, such as ethylene glycol and propylene glycol. It is within the scope of the present disclosure that the fuel processor may be adapted to produce hydrogen gas by utilizing more than a single hydrogen-producing mechanism.

In many applications, it is desirable for hydrogen-generation assembly 138 to produce at least substantially pure hydrogen gas. Accordingly, the hydrogen-generation assembly may include one or more hydrogen-producing regions that utilize a process that inherently produces sufficiently pure hydrogen gas, or the hydrogen-generation assembly may include suitable purification and/or separation devices that remove impurities from the hydrogen gas produced in the hydrogen-producing region. As another example, the hydrogen-generation assembly may include purification and/or separation devices that are downstream from the hydrogen-producing region and adapted to reduce the concentration of one or more non-hydrogen components of the reaction product stream from the hydrogen-producing region. In the context of a fuel cell system, the hydrogen-generation assembly may be adapted to produce at least substantially pure hydrogen gas, or even pure hydrogen gas. For the purposes of the present disclosure, substantially pure hydrogen gas refers to hydrogen gas that is greater than 90% pure, and optionally greater than 95% pure, greater than 99% pure, or greater than 99.5% pure. Illustrative, non-exclusive examples of suitable fuel processors are disclosed in U.S. Pat. Nos. 6,221,117, 5,997,594, 5,861,137, and U.S. Patent Application Publication Nos. 2001/0045061, 2003/0192251, and 2003/0223926. The complete disclosures of the above-identified patents and published patent applications are hereby incorporated by reference for all purposes.

Reactant delivery system 110 may include any suitable flow-management devices 140, which may be mechanism(s) and/or structure(s) for carrying, guiding, restricting flow of, and/or driving fuel and/or oxidant between the fuel and oxidant sources and the fuel cell stack via conduit assembly 128. The reactant delivery system and/or conduit assembly may be considered distinct from the fuel source and/or the oxidant source, or may constitute a portion or all of one or both sources. The reactant delivery system thus may include any suitable combination of conduits, valves, and/or drive mechanisms (to drive valve operation and/or fluid flow), among others. Each flow-management device may be operable manually (i.e., requiring human effort or action), automatically (i.e., by machine without the need for triggering or implementing human effort or action), or both. If operable manually, the flow-management device may be configured to be operated by hand or by a drive mechanism that is controlled by direct human action. Each flow-management device 140 may be structured to exert any suitable effect on the flow rate and/or flow direction of a fuel stream and/or oxidant stream between its respective source (120 and/or 122) and fuel cell stack 42. Accordingly, each flow-management device 140 may function to increase or decrease the corresponding fluid flow rate and/or to start or stop fluid flow. Alternatively, or in addition, each flow-management device 140 may function to divert flow of fuel and/or oxidant to a distinct flow path. Illustrative flow-management devices may include a valve and/or a drive mechanism. Any suitable type of valve may be used, such as stopcock, bleed, needle, shut-off, pinch, angle, ball, check (to restrict reverse flow), butterfly, diaphragm, flipper, solenoid, globe, slide, gate, or the like.

Fuel cell systems 22 and/or power delivery networks 20 according to the present disclosure may, but are not required to, also include a control system 150. Control system 150 may include at least one controller 152 (e.g., a microprocessor and/or a computing device, among others) that selectively regulates the operation of the fuel cell system 22 and/or power delivery network 20, such as by monitoring and/or controlling the operation of various components and/or monitoring and/or controlling various operating parameters of fuel cell system 22 and/or power delivery network 20. The controller may have any suitable configuration, and may include software, firmware, and/or hardware components.

The control system may include any suitable number and type of communication links for receiving input signals and for sending output signals (e.g., command signals). For the purpose of schematic illustration, controller 152 is shown in FIG. 3 in communication, via respective communication links 154-166, with reactant delivery system 110, fuel cell stack 42, and each of the power-management modules 74 and sensors 80. However, each of these communication links is optional and thus power delivery network 20 and/or fuel cell system 22 may be configured to have any suitable subset of the communication links depicted here. Furthermore, alternatively or in addition, the controller may be in communication with and/or operatively coupled to any other suitable portion of power delivery network 20. The control system may include or be in communication with any suitable number and type of sensors 80 for measuring various system or ambient parameters or characteristics (such as temperature, pressure, flow rate, current, voltage, capacity, composition, etc.) and communicating these values to the controller.

Communication between control system 150 and any portion of power delivery network 20 may be mostly or exclusively one-way communication or may include at least two-way communication. In some embodiments, the control system 150 may include a plurality of controllers 152 in communication with each other. For example, one of the controllers may be a primary, or central, controller that coordinates and controls the activity of one or more (or all) other controllers. Coupling and/or communication between the controllers and/or between a controller and each other fuel cell system 22 and/or power delivery network 20 component may be wired or wireless for each coupling and thus may be electrical (e.g., conductive), electromagnetic (e.g., inductive and/or capacitive coupling), optical, and/or the like.

The control system may automate and/or control any suitable aspects of fuel cell system operation. For example, the control system may control (1) determination of a start time for performing maintenance, (2) initiation of fuel (and optionally oxidant) delivery (i.e., activation of the fuel cell stack) based on the start time, (3) electrical output, including output voltage, (4) maintenance duration, and/or the like. Accordingly, the control system may automate measurement and/or adjustment of fuel cell system 22 and/or power delivery network 20 characteristics. Further optional aspects of methods that may be performed by the control system of fuel cell system 22 and/or power delivery network 20 are described in relation to FIGS. 5-9.

Control system 150 may include a timer mechanism (a clock or timer) 168 in communication with controller 152. The timer mechanism may measure relative time (e.g., elapsed time since a particular event). An illustrative, non-exclusive example of a relative time to be measured includes a time period since the fuel cell stack was last hydrated by maintenance hydration and/or standard operation. Illustrative, non-exclusive examples of such a time period include at least one day, one week, two weeks, a month, etc. Other examples of relative time to be measured include a time period since maintenance hydration was last attempted unsuccessfully and/or was initiated but not completed. Alternatively, or in addition, the timer may measure or keep track of calendar time, that is, date and/or time of day.

Controller 152 may operate reactant delivery system 110, such as hydrogen generation assembly 138 and/or one or more flow-management device(s) 140 thereof, based on one or more time values measured by timer mechanism 168. For example, the controller may be programmed or otherwise configured to initiate fuel delivery for maintenance hydration in response to a preset elapsed time or preset start time measured by the timer. The elapsed time and/or start time may be preset, or configured, to initiate maintenance hydration periodically with any suitable frequency of hydration, such as one or more times per day, one or more times per week, one or more times per month, etc. Accordingly, the fuel cell system may be programmed to perform automatic hydration operations on a regular or irregular basis when the fuel cell system is idle or dormant (i.e., not being used as an auxiliary power source in response to unavailability or insufficiency of the primary power source). In some embodiments, one or more maintenance hydration treatments may be performed based on when the fuel cell system was last operated to generate power (i.e., in a power-generating configuration) or without regard to when the fuel system was used to generate power.

The control system, and particularly controller 152, may provide automated control of activation and deactivation (or shutdown) of the fuel cell system. In particular, the control system may control delivery of fuel and/or oxidant to the fuel cell stack. The controller thus may be operatively coupled to any suitable portion of the reactant delivery system 110 to control configuring of the fuel cell system 22 for power generation (e.g., initiating delivery of one or more reactants to the fuel cell stack) and/or for inactivity (e.g., stopping delivery of one or more reactants to the fuel cell stack). For example, the controller may be operatively coupled to a flow-management device 140 that initiates or stops flow of a reactant, such as fuel and/or oxidant, to respectively activate or deactivate the fuel cell system. As used herein, the fuel cell system may be referred to as being inactive, or deactivated, when it is in any configuration that provides no delivery of fuel 112 and/or oxidant 116 to the fuel cell stack 42. Accordingly, with the fuel cell system in the inactive configuration, the control system 150 may be active but there may be no, or no substantial, generation of electrical output (and/or electrical potential) by the fuel cell stack and no, or no significant, formation of water from reaction of the fuel and the oxidant.

Controller 152 may be adapted to control operation of reactant delivery system 110, and/or the flow of fuel and/or oxidant through conduit assembly 128, based at least in part on one or more fuel cell system characteristics and/or ambient characteristics measured by sensor(s) 80. The characteristics may relate to a condition of the fuel cell system itself, as measured by one or more illustrative sensors 96, 98 associated with fuel cell stack 42, and/or may relate to the environment outside, but generally near, the fuel cell system, as represented by illustrative ambient sensors 94, 100. Illustrative characteristics may correspond to a fuel cell system temperature, ambient temperature, a hydration level of the fuel cell stack, ambient humidity, and/or the like.

The controller's operations, such as the command signals generated thereby, may be provided by or otherwise correspond to an algorithm for determining when a fuel cell system should be operated for maintenance hydration, and/or for how long the fuel cell system should be operated for maintenance hydration. The algorithm may consider any suitable combination of ambient temperature, system temperature, sensed hydration level of a fuel cell or fuel cell stack, ambient humidity, length of time the fuel cell system has been inactive (since the most recent maintenance hydration and/or since generation of electrical output), and/or the like. In some embodiments, hydration of the fuel cell system may be performed according to a preset value, such as a preset time interval between maintenance hydration treatments and/or since a fuel cell (or fuel cell stack or fuel cell system) was last in a power-generating configuration. However, the preset time interval may (but is not required to) be adjusted based on other measured conditions and/or preset values, such as average ambient temperature, average ambient humidity, sensed hydration level of the fuel cell stack, a preset threshold temperature for performing a hydration treatment, a preset threshold hydration level for performing a hydration treatment, and/or the like.

Fuel cell system 22 may include any other suitable components. For example, fuel cell system 22 also may, but is not required to, include a thermal management system. The thermal management system may be adapted to regulate the temperature of any suitable portion of fuel cell system 22, for example, maintaining the fuel cell stack within a predetermined, or selected, operating temperature range, such as below a maximum threshold temperature, and/or above a minimum threshold temperature. The thermal management system thus may include a cooling mechanism and/or a heating mechanism. For example, the thermal management system may utilize a fluid that is propelled around a flow circuit by a pump. The fluid may flow through and/or around fuel cell stack 42, to provide cooling and/or heating of the fuel cell stack. The flow circuit may (but is not required to) include a thermostatic valve that operates to direct the fluid into the proximity of the cooling/heating mechanism, for heat transfer, or to divert the fluid away from the cooling/heating mechanism via a detour, according to the temperature of the fuel cell stack and/or the fluid. Any suitable cooling mechanism and/or heating mechanism may be used in the fuel cell system. For example, the cooling mechanism may include a radiator and at least one fan. In other embodiments, the cooling mechanism may include a refrigerating compressor, a Peltier device, a fan or blower, etc. Illustrative heating mechanisms may include a resistive heater, a combustion heater (e.g., a gas heater), an infrared lamp, a Peltier device, or the like. The temperature of the thermal control system may be measured by a temperature sensor. An illustrative, non-exclusive example of suitable thermal management systems are disclosed in U.S. Patent Application Publication No. 2007/0042247, the complete disclosure of which is hereby incorporated by reference. Additional illustrative, non-exclusive examples of auxiliary fuel cell systems, and components and configurations therefor, are disclosed in U.S. Patent Application Publication No. 2004/0247961, the complete disclosure of which is hereby incorporated by reference.

Fuel cell system 22 may include fuel cell stack 42 that includes at least one fuel cell 46, and typically, a plurality of fuel cells 46. The fuel cells may be electrically connected to one another, such as in a series, and mechanically connected to provide fluid communication between the fuel cells. Although not required by all embodiments, the fuel cells may be arranged face-to-face with one another, and in one stack or two or more adjacent stacks, or, for example, in more complex geometrical arrangements.

Figure 4:
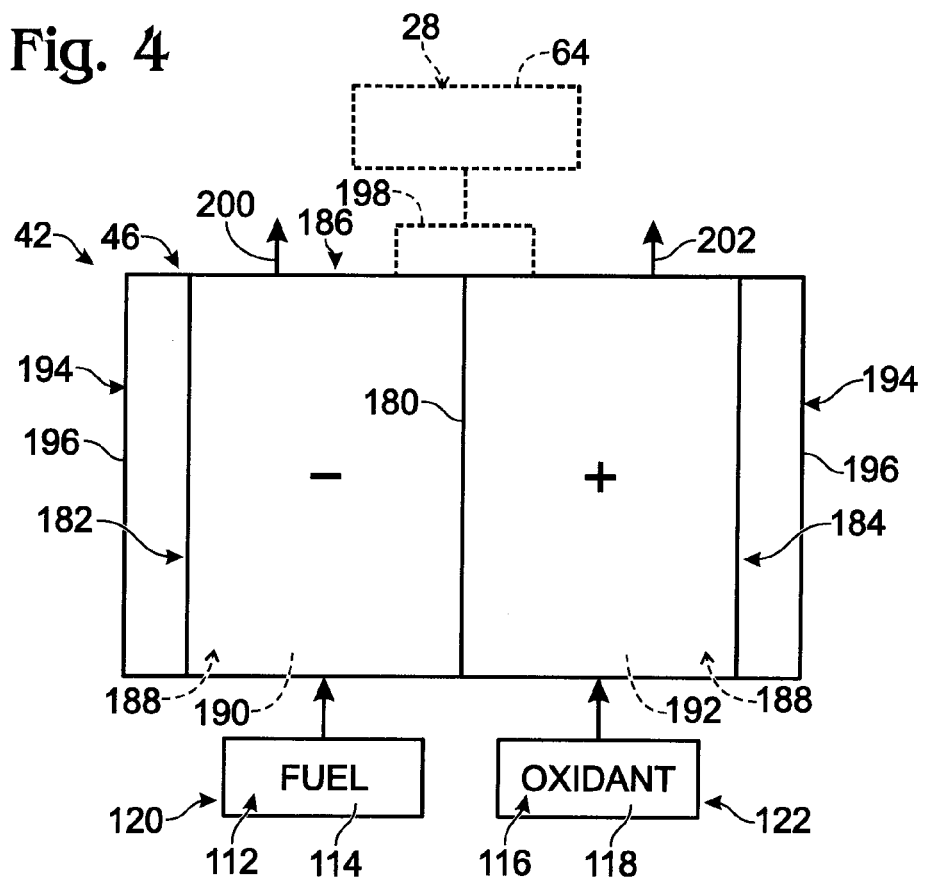
FIG. 4 is a schematic view of selected aspects of an illustrative fuel cell, as may be used in fuel cell stacks according to the present disclosure.

The fuel cell stacks of the present disclosure may utilize any suitable type of fuel cell, including but not limited to fuel cells that receive hydrogen gas and oxygen gas as proton sources and oxidants. An illustrative, non-exclusive example of such a fuel cell is a proton exchange membrane (PEM), or solid polymer, fuel cell, although the maintenance hydration systems and methods of the present disclosure may be used with other types of fuel cells in which maintaining the hydration level of the fuel cell after periods of inactivity is desirable. For the purpose of illustration, an exemplary fuel cell 46 in the form of a proton exchange member (PEM) fuel cell is schematically illustrated in FIG. 4.

Each fuel cell 46 may be structured to generate an electrical potential using discrete regions separated by a divider, or electrolytic barrier, 180 (which also may be referred to as an electron barrier). For example, the fuel cell may include an anode region 182 (the anode regions are collectively indicated schematically by "−") and a cathode region 184 (the cathode regions are collectively indicated schematically by "+"), with respective negative and positive electrical biases or charges during fuel cell operation. Electrolytic barrier 180 may act to divide the fuel cell 46 such that the fuel and the oxidant do not freely mix with one another, while permitting selective movement of positive charge through the barrier (and thus acting as an electron barrier). The barrier restricts contact, particularly substantial contact of the fuel and oxidant, meaning that the fuel and the oxidant remain (mostly) separated from each other. However, while not necessarily desired or required by all embodiments, in some embodiments the electrolytic barrier may permit a minor amount of leakage of the fuel and/or oxidant across the barrier while still serving as a barrier. The electrolytic barrier may be structured as a sheet- or membrane-supported electrolyte, for example, a proton exchange membrane 180 that permits passage of protons while blocking passage or flow of electrons, and as such may also be described as an ion exchange membrane.

Proton exchange membrane fuel cells typically utilize a membrane-electrode assembly 186 consisting of an ion exchange, or electrolytic, membrane 180 located between an anode region 182 and a cathode region 184. Each region 182 and 184 includes an electrode 188, namely, an anode 190 and a cathode 192, respectively. Each region 182 and 184 also includes a support 194, such as a supporting plate 196. Support 194 may form a portion of a bipolar plate assembly. The supporting plates 196 of fuel cell 46 may carry, or conduct, the relative voltage potential produced by the fuel cell.

In operation, hydrogen gas 114 from supply 120 is delivered to the anode region, and air (and/or oxygen) 118 from supply 122 is delivered to the cathode region. Hydrogen gas and oxygen gas may be delivered to the respective regions of the fuel cell via any suitable mechanism from respective supplies 120 and 122.

Hydrogen gas and oxygen gas typically react with one another via an oxidation-reduction reaction. Although electrolytic membrane 180 restricts the passage of a hydrogen molecule (a fuel molecule), it will permit a hydrogen ion (proton) to pass through it, largely due to the ionic conductivity of the membrane. The free energy of the oxidation-reduction reaction drives the proton from the hydrogen gas through the barrier. As membrane 180 also tends not to be electrically conductive, an external circuit 198 is the lowest energy path for the remaining electron. In cathode region 184, electrons from the external circuit and protons from the membrane combine with oxygen to produce water and heat.

Also shown in FIG. 4 are an anode purge, or exhaust, stream 200, which may contain hydrogen gas, and a cathode air exhaust stream, or cathode purge stream, 202, which is typically at least partially, if not substantially, depleted of oxygen gas. Anode purge stream 200 may also include other components, such as nitrogen gas, water, and other gases that are present in the hydrogen gas or other fuel stream that is delivered to the anode region. Cathode purge stream 202 will typically also include water. Fuel cell stack 42 may include a common hydrogen (or other reactant/fuel) feed, air intake, and stack purge and exhaust streams, and accordingly may include suitable fluid conduits to deliver the associated streams to, and collect the streams from, the individual fuel cells. Similarly, any suitable mechanism may be used for selectively purging the regions. It is also within the scope of the present disclosure that the hydrogen gas stream that is delivered to the anode region as a fuel stream may be (but is not required to be) recycled (via any suitable mechanism and/or via a suitable recycle conduit from the anode region) to reduce the amount of hydrogen gas that is wasted or otherwise exhausted in anode purge stream 200. As an illustrative, non-exclusive example, the hydrogen gas in the anode region may be recycled for redelivery to the anode region via a recycle pump and an associated recycle conduit. In such an embodiment, the recycle pump may draw hydrogen gas from the anode region of a fuel cell (or fuel cell stack) and redeliver the recycled hydrogen gas via the recycle conduit to the anode region of the fuel cell (and/or a different fuel cell or fuel cell stack).

In practice, fuel cell stack 42 may include a plurality of fuel cells 46 with bipolar plate assemblies or other suitable supports separating adjacent membrane-electrode assemblies. The supports may permit the free electrons to pass from the anode region of a first cell to the cathode region of the adjacent cell via the bipolar plate assembly, thereby establishing an electrical potential through the stack. This electrical potential may create a net flow of electrons that produces an electric current, which may be used to satisfy an applied load, such as from an energy-consuming device(s) 64.

Figure 5:
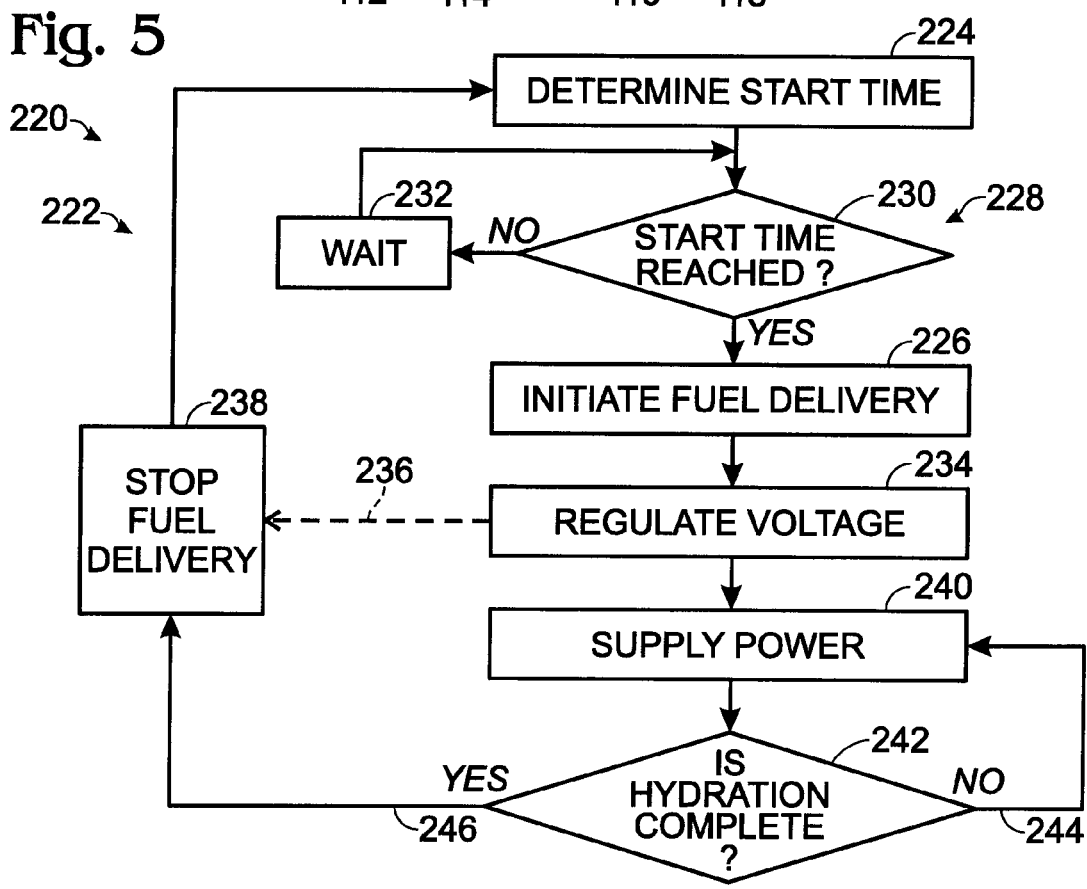
FIG. 5 is a flowchart for an illustrative method of performing maintenance hydration of a fuel cell system in the power delivery network of FIGS. 1-3, in accordance with aspects of the present disclosure.

FIG. 5 is a flowchart 220 representing an illustrative, non-exclusive example of a method 222 of performing maintenance hydration of a fuel cell system 22 serving as a backup (or auxiliary) power source in a power delivery network 20. Method 222 may include any suitable combination of the method steps presented here and in FIGS. 6-9 and the method steps may be performed in any suitable order. Each method step presented and/or described in the present disclosure may be included in or omitted from the method, as appropriate. If included, each method step may be performed once, twice, or more times. In addition, in some embodiments, one or more of the method steps may be performed conditionally, that is, only if one or more conditions are met by system 22, power delivery network 20, and/or the ambient environment. Furthermore, any suitable portion or all of each method 222 described herein may be performed automatically, for example, controlled by a control system 150 and/or controller(s) 152 of system 22 and/or power delivery network 20, may be controlled or performed mechanically, or may be controlled manually by a person.

The method may be performed under control of a program run by a controller. Accordingly, the method may be embodied in computer program code carrying instructions and stored on tangible computer-readable storage media (e.g., hard drives, CD-ROMs, floppy disks, etc.). In particular, when the computer program code is loaded and executed by the controller, the controller becomes an apparatus for practicing the method in conjunction with other portions of a power delivery network. In some embodiments, the computer program code may be received from another source via data transmission, such as fiber optics, electromagnetic radiation, electrical conductors (e.g., wires, cables, etc.), or the like.

Method 222 may include a step of determining a start time for performing maintenance hydration, as indicated at 224. Determining a start time, as used herein, may include selecting a start time, establishing a start time, identifying a start time, and/or starting maintenance hydration. The start time may be determined by any suitable criteria. For example, the start time may be determined based, at least in part, on when the fuel cell system was last activated by fuel delivery, last operated to provide backup power, and/or last operated to perform maintenance hydration. Accordingly, the start time may be determined, for example, based, at least in part, on a time interval measured by timer 168 under the direction of controller 152. Alternatively, or in addition, the start time may be determined based, at least in part, on one or more signals received from at least one sensor 80. The start time thus may be based, at least in part, on a threshold level of dehydration measured by a hydration sensor of fuel cell stack 42, an electrical characteristic of the primary power source, an electrical characteristic of the applied load, an ambient temperature, an ambient humidity, and/or the like.

Method 222 also may include a step of initiating delivery of at least fuel to the fuel cell stack, as indicated at 226. The step of initiating delivery may involve initiating delivery of any suitable reactants to the fuel cell stack, for example, delivery of fuel and oxidant or delivery of fuel only, such as if an oxidant is already available to the fuel cell stack. In any case, the step of initiating delivery may be described as activating the fuel cell stack and/or fuel cell system for power generation. "Activating" or "activation," as used herein, means providing the fuel cell stack 42 with a complete set of reactants (fuel and oxidant) for electrochemical reaction in the fuel cell stack, whether or not a load is drawing power from the fuel cell stack. The step of initiating delivery thus may activate the fuel cell stack to place the fuel cell stack in an active configuration from an inactive configuration, in which the fuel cell stack was not being supplied with at least one reactant and thus was not generating power. Initiating delivery of fuel may result in a stream of fuel that is substantially constant over time or that varies (e.g., an increasing and/or decreasing volume of fuel being delivered per unit time). Furthermore, the step of initiating delivery may include operating the reactant delivery system, such as operating a flow-management device (e.g., opening a valve(s)) and/or processing fuel from a feedstock, among others.

The step of initiating delivery of fuel and/or reactants may be performed according to the start time determined at 224 in method 222. The term "according to the start time," as used herein, generally includes "based on the start time" or "in correspondence with the start time." Accordingly, the step of initiating delivery may, for example, start exactly or nearly exactly at the start time or after passage of a relatively short delay after the start time (such as within about one second, one minute, or one hour of the start time). The delay may be caused by one or more procedures conducted by method 222 and/or network 20 before fuel delivery is initiated. Illustrative procedures may include testing aspects of the network 20 (e.g., testing whether the load is sufficient, testing the stability of the load, measuring fuel cell stack hydration, measuring an electrical characteristic of the primary power source, etc.) and/or establishing generation of a fuel from a feedstock or release of fuel from a stored form, among others.

Determination of a start time may involve selecting a start time in the future. Accordingly, method 222 optionally may include a step of monitoring elapsed time, as indicated generally at 228, until the start time has been reached. For example, method 222 may include a conditional decision point that compares the elapsed time with the target start time, as indicated at 230, to determine whether or not the start time has been reached. If the start time has not been reached, the method may include waiting, as indicated at 232, for an additional time period and then performing the comparison again. The resulting "wait and compare" loop may be repeated until the start time is reached. If the start time has been reached, method 222 may exit the loop and proceed to the next step of performing maintenance hydration, such as initiation of fuel delivery 226. Although referred to in the context of initiating fuel delivery, it is within the scope of the present disclosure that this step may include initiating oxidant, such as air, delivery. In some embodiments, determination of a start time may include selecting the present time as the start time. For example, one or more sensors may be used, directly or indirectly (e.g., via a controller), to determine the start time and thus may trigger performance (or attempted performance) of maintenance hydration upon measurement of a threshold value. Accordingly, method 222 may proceed directly to the next step of the method, such as step 226, without waiting after determination of the start time.

Method 222 also may include regulating a voltage of the fuel cell system, as indicated at 234, which may be performed automatically and/or manually. Regulating the voltage generally includes any manipulation or adjustment of the output voltage of fuel cell system 22 to achieve an output voltage at which an applied load of the energy-consuming assembly is at least partially satisfied by fuel cell power in place of available primary power. Accordingly, regulating the voltage may include setting or adjusting the output voltage of the fuel cell system (1) to a predefined setpoint that is known or expected to be higher than the voltage of the primary power source, (2) according to, or responsive to, a measured voltage (or other measured electrical characteristic) of the primary power source, and/or (3) to progressively higher levels until the fuel cell system is generating sufficient power (and/or until a threshold voltage is reached and/or exceeded).

The step of regulating voltage 234, if not performed successfully, may be followed, as indicated with a dashed line 236, by a step of stopping fuel delivery, as indicated at 238. Stated differently, the fuel cell stack may be deactivated by terminating fuel (and/or oxidant) delivery if a sufficient output voltage cannot be achieved at the present time. A new or next start time also may be determined, as indicated at 224, before, during, and/or after the step of stopping fuel delivery. The new or next start time may correspond to the next scheduled periodic maintenance (i.e., by canceling rather than postponing the current maintenance treatment) or may be much sooner than the next periodic maintenance, such as in one hour or less or one day or less.

Regulation of the voltage 234, if performed successfully, may lead to a step of supplying power, as indicated at 240, from fuel cell system 22 to the energy-consuming assembly 28 to satisfy at least a portion, if not all, of the applied load from the energy-consuming assembly while the primary power source 24 is generating an electrical output and available to satisfy the portion (or all) of the applied load being satisfied by the electrical output of the fuel cell stack of fuel cell system 22. The step of supplying power generally includes generating water to increase hydration of the fuel cell stack 42. In addition, the step of supplying power may include generating fuel cell power at any suitable percentage of the full capacity for power generation by the fuel cell stack 42, such as at least 25%, at least 50%, at least 75%, or more of full capacity.

The step of supplying power may be performed for any suitable hydration interval to achieve a maintenance hydration treatment after a period of fuel cell inactivity. As used herein, the term "hydration interval" may refer to a period during which water is generated in the fuel cell stack. As discussed, the hydration interval may correspond to a period in which the fuel cell stack is generating power that displaces at least a portion of available primary power. The term "maintenance hydration treatment," as used herein, may refer to supplying power for a hydration interval sufficient to substantially increase hydration of the fuel cell stack, such as increasing the amount of hydration by at least 10%, 25%, or 50%, among others. The maintenance hydration treatment may be performed in a predetermined fashion, such as for a predetermined period of time and/or for a predetermined amount of supplied power, hydration, and/or water generation, among others.

As used herein, "period of inactivity" refers to a period in which the fuel cell stack has not been used to generate an electrical output for more than at least a threshold period of time, such as at least one day, one week, two weeks, one month, or more, and/or for a period sufficient to reduce hydration of the fuel cell stack substantially. "Period of inactivity" thus does not encompass a momentary interruption in the fuel cell stack being in a power-generating configuration, such as in which the hydration state of the fuel cell stack has not appreciably deteriorated from when the fuel cell stack was in a power-generating configuration.

Method 222 may include a decision process 242 that determines whether or not the maintenance hydration treatment is complete. For example, decision process 242 may determine if fuel cell power has been supplied for a predetermined period of time and/or for a predetermined amount of supplied power, hydration, and/or water generation, among others. If the treatment is not complete, as indicated at 244, the step of supplying power may be continued. If the treatment is complete, as indicated at 246, at least fuel delivery may be stopped, as indicated at 238, and another start time may be determined, as indicated at 224.

Figure 6:
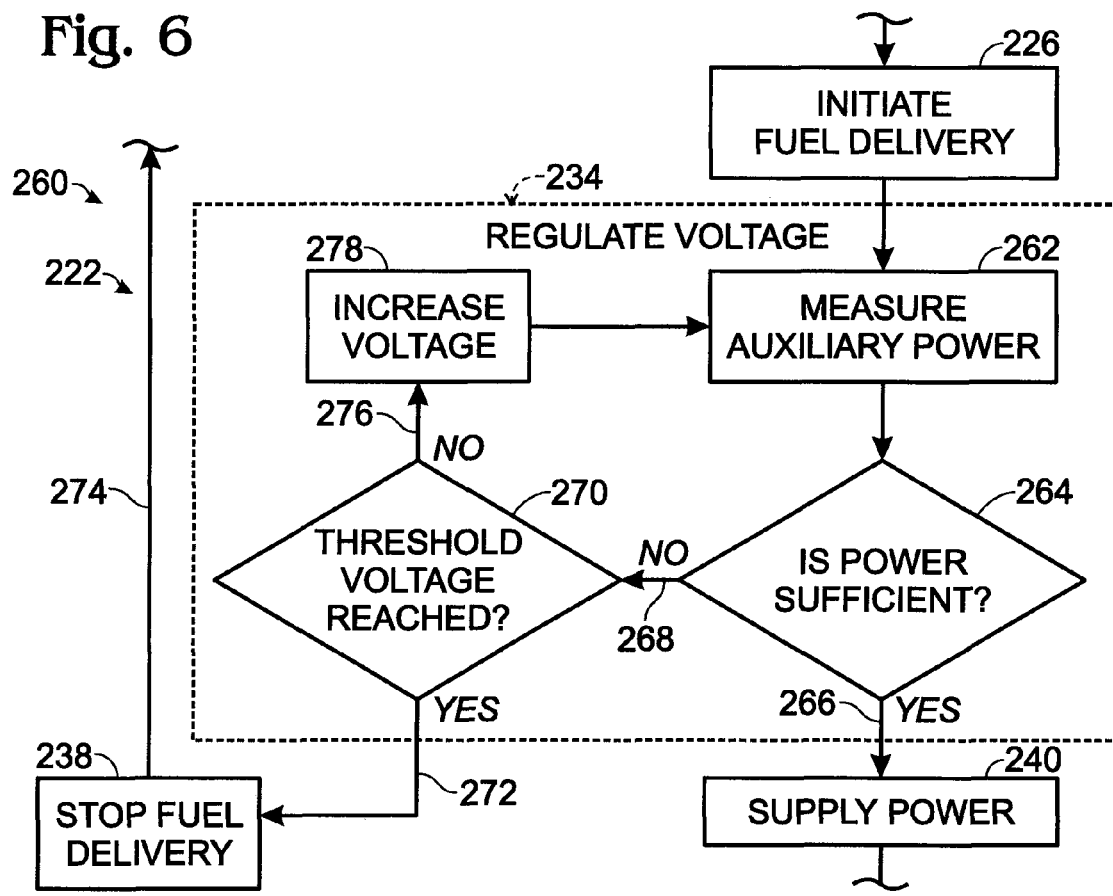
FIG. 6 is a fragmentary flowchart for selected portions of the illustrative method of FIG. 5, including an illustrative approach to regulating voltage in the method, in accordance with aspects of the present disclosure.

FIG. 6 is a fragmentary flowchart 260 presenting selected portions of method 222 and showing an illustrative approach to regulating voltage, as indicated at 234, in method 222. The approach presented here may be performed whether or not the voltage of the primary power source is known, but may be particularly suitable when this voltage is unknown. At a suitable timepoint after initiation of fuel delivery, as indicated at 226, a sensor 80 may measure an electrical characteristic of the fuel cell system corresponding to auxiliary power (fuel cell power), as indicated at 262. The auxiliary power may be measured using any suitable sensed electrical characteristic.

A decision process 264 then may determine whether or not the measured fuel cell power is sufficient for maintenance hydration. If sufficient (e.g., if at and/or above a threshold power value), as indicated at 266, the method may proceed to supplying power, as indicated at 240, to the energy-consuming assembly 28. If not sufficient (e.g., if below the threshold power value), as indicated at 268, method 222 may proceed to a second decision process 270 that determines whether or not the output voltage of the fuel cell stack has reached and/or exceeded a threshold voltage. If the threshold voltage has been reached and/or exceeded, as indicated at 272, method 222 may proceed to stopping fuel delivery, as indicated at 238, and also may proceed, as indicated at 274, to determining another start time (see FIG. 5). If the threshold voltage has not been reached and/or exceeded, as indicated at 276, method 222 may proceed to a step of increasing the output voltage, as indicated at 278, from the fuel cell stack 42. The fuel cell power then may be measured (again), as indicated at 262. The step of increasing the voltage may be performed incrementally with each cycle through the voltage regulation loop. The voltage may be increased by the same increment in each cycle, such as 0.1-1.0 volt per cycle, or about 0.1, 0.25, 0.5, or 1.0 volt per cycle, among others. Alternatively, the size of the increase may vary within the scope of the present disclosure. This method, or process, may be referred to as incrementally increasing the voltage of the electrical output of the fuel cell stack until either a sufficient portion of the electrical output of the primary source is displaced (i.e., a sufficient portion of the applied load is now being satisfied by the fuel cell system instead of the primary power source despite the primary power source generating an electrical output) or until a threshold fuel cell voltage is reached or exceeded.

Figure 7:
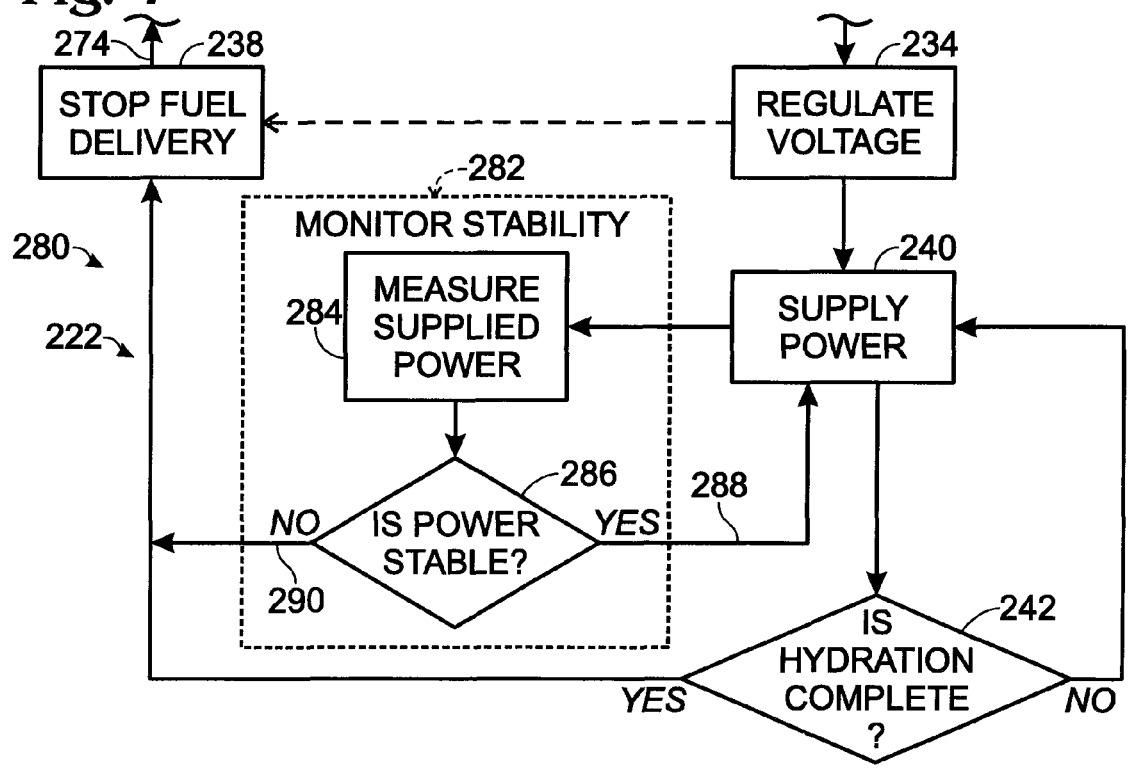
FIG. 7 is a fragmentary flowchart for selected portions of the illustrative method of FIG. 5, including an illustrative approach to monitoring stability of the power supplied from the fuel cell system, in accordance with aspects of present disclosure.

FIG. 7 is a fragmentary flowchart 280 presenting selected portions of method 222 and showing an illustrative approach to monitoring stability of the power supplied from the fuel cell system. The stability of the fuel cell power may be monitored, as indicated at 282, as primary power is being supplied, as indicated at 240, to energy-consuming assembly 28. Monitoring the fuel cell power may include a step of measuring the supplied fuel cell power, as indicated at 284. The step of measuring may be performed multiple times to provide a measure of fuel cell power over time. Method 222 then may proceed to a decision process 286 that determines whether or not the fuel cell power is sufficiently stable for performance of maintenance hydration. For example, decision process 286 may determine whether or not fuel cell power varies by more than a threshold amount. In any case, if decision process 286 determines that the fuel cell power is sufficiently stable, as indicated at 288, the step of supplying fuel cell power, as indicated at 240, may be continued. In contrast, if decision process 286 determines that the fuel cell power is not sufficiently stable, as indicated at 290, the step of supplying power may be stopped by performing the step of stopping fuel delivery, as indicated at 238. Method 222 optionally may proceed, as indicated at 274, to determining another start time (see FIG. 5) to attempt maintenance hydration again. For example, maintenance hydration (e.g., regulating voltage and supplying power) may be attempted again after waiting a predetermined time period. Illustrative, non-exclusive examples of such time periods include 1 week or less, 3 days or less, 1 day or less, 12 hours or less, 6 hours or less, 2 hours or less, 1 hour or less, or about 1, 5, 10, 30, or 60 minutes, among others.

Figure 8:
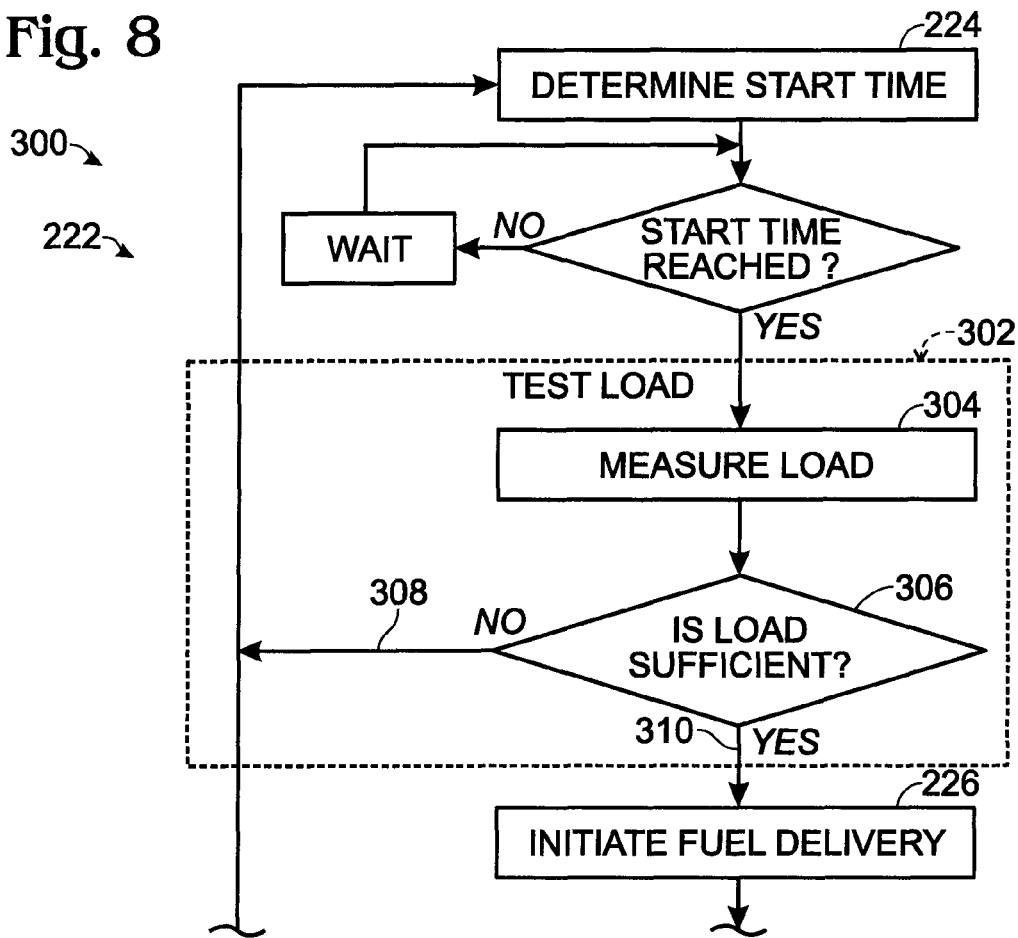
FIG. 8 is a fragmentary flowchart for selected portions of the illustrative method of FIG. 5, including an illustrative approach for testing an applied load prior to initiating fuel delivery, in accordance with aspects of the present disclosure.

FIG. 8 is a fragmentary flowchart 300 presenting selected portions of illustrative method 222 and showing an illustrative approach for testing an applied load prior to initiating fuel delivery. The applied load may be tested, as indicated at 302, according to the start time. The step of testing the applied load may include a step of measuring the applied load, as indicated at 304. Method 222 then may proceed to a decision process 306 that determines whether or not the measured load is sufficient for performing maintenance hydration with the fuel cell system. If the load is not sufficient, as indicated at 308, method 222 may proceed to determination of another start time, as indicated at 224, such as another start time after passage of a predetermined time interval. If the load is sufficient, as indicated at 310, method 222 may proceed to the step of initiating fuel delivery, as indicated at 226. In some embodiments, the step of testing the applied load, as indicated at 302, may be performed after the step of initiating fuel delivery, as indicated at 226. Accordingly, if fuel delivery has been initiated before testing the applied load, fuel delivery may be stopped if the applied load is determined to be insufficient for maintenance hydration.

Figure 9:
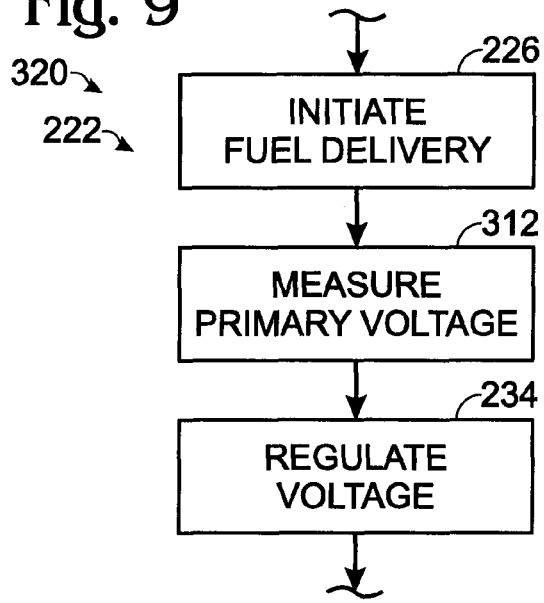
FIG. 9 is a fragmentary flowchart for selected portions of the illustrative method of FIG. 5, including an illustrative approach to regulating the voltage of the fuel cell system according to a measured voltage of the primary power source, in accordance with aspects of the present disclosure.

FIG. 9 is a fragmentary flowchart 320 for selected portions of illustrative method 222 and shows an illustrative approach to regulating the voltage of the fuel cell system. Method 222 may include a step of measuring a primary voltage, as indicated at 312. The "primary voltage," as used herein, means the voltage at which the primary power source is supplying primary power to the energy-consuming assembly. The step of measuring a primary voltage may be performed by measuring any suitable electrical characteristic of the primary power source related to its primary voltage. Measurement of primary voltage may be performed at any suitable time, such as before or after the step of initiating fuel delivery, as indicated at 226. The step of regulating voltage of the fuel cell system, as indicated at 234, then may be performed according to the measured primary voltage. For example, the output voltage of the fuel cell stack may be adjusted to a level that is above the measured primary voltage, such as a predetermined amount above the measured primary voltage (e.g., at least 0.25, 0.5, 1, or 2 volts, among others, above the primary voltage). In some embodiments, the primary voltage may be measured repeatedly during maintenance hydration to enable adjustment of the output voltage of the fuel cell stack, if needed, due to variation in the measured primary voltage.

In some embodiments, the present disclosure may be described as being directed to a storage medium encoded with a machine readable computer program code, the code including instructions for causing a controller to implement a method of performing maintenance hydration of a fuel cell system serving as an auxiliary power source for an energy-consuming assembly that is disposed in electrical communication with a primary power source. In such an embodiment, the method may include any of the methods described, illustrated, and/or incorporated herein. As an illustrative, non-exclusive example, the method may include at least determining a start time for maintenance of the fuel cell system, activating the fuel cell system from an inactive condition according to the start time by initiating delivery of at least fuel to a fuel cell stack of the system, and supplying power from the activated fuel cell system to satisfy at least a portion of an applied load from the energy-consuming assembly. In such an example, the power from the fuel cell system may be supplied at an output voltage that is higher than a voltage at which power from the primary power source is being supplied to the energy-consuming assembly, such that the energy-consuming assembly uses, at least in part, the power from the fuel cell system instead of the power from the primary power source, thereby operating the fuel cell system for power generation and associated hydration while the primary power source is available.

In some embodiments, the present disclosure may be described as being directed to a set of data signals that include instructions for causing a controller to implement a method of performing maintenance hydration of a fuel cell system serving as an auxiliary power source for an energy-consuming assembly that is disposed in electrical communication with a primary power source. In such an embodiment, the method may include any of the methods described, illustrated, and/or incorporated herein. As an illustrative, non-exclusive example, the method may include at least determining a start time for maintenance of the fuel cell system, activating the fuel cell system from an inactive condition according to the start time by initiating delivery of at least fuel to a fuel cell stack of the system, and supplying power from the activated fuel cell system to satisfy at least a portion of an applied load from the energy-consuming assembly. In such an example, the power from the fuel cell system may be supplied at an output voltage that is higher than a voltage at which power from the primary power source is being supplied to the energy-consuming assembly, such that the energy-consuming assembly uses, at least in part, the power from the fuel cell system instead of the power from the primary power source, thereby operating the fuel cell system for power generation and associated hydration while the primary power source is available.

INDUSTRIAL APPLICABILITY

The fuel cell systems disclosed herein are applicable to the energy-production industries, and more particularly to the fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of performing maintenance hydration of a fuel cell system serving as an auxiliary power source for an energy-consuming assembly that is disposed in electrical communication with a primary power source, the method comprising:

determining a start time for maintenance of the fuel cell system;

activating the fuel cell system from an inactive condition according to the start time by initiating delivery of at least fuel to a fuel cell stack of the system; and supplying power from the activated fuel cell system to satisfy at least a portion of an applied load from the energy-consuming assembly, wherein the power from the fuel cell system is supplied at an output voltage that is higher than a voltage at which power from the primary power source is being supplied to the energy-consuming assembly, such that the energy-consuming assembly uses, at least in part, the power from the fuel cell system instead of the power from the primary power source, thereby operating the fuel cell system for power generation and associated hydration while the primary power source is available.

2. The method of claim 1, wherein the step of supplying power is continued for a hydration interval and then is stopped after completion of a predetermined maintenance hydration treatment.

3. The method of claim 2, wherein the hydration interval corresponds to a predetermined time interval, and wherein the step of supplying power is stopped after the power from the fuel cell system has been supplied to the energy-consuming assembly for the predetermined time interval.

4. The method of claim 2, wherein the predetermined maintenance hydration treatment corresponds to a predetermined amount of power supplied from the fuel cell system, and wherein the step of supplying power is stopped after the predetermined amount of power has been supplied to the energy-consuming assembly from the fuel cell system by the step of supplying power.

5. The method of claim 2, wherein the step of supplying power is stopped after a predetermined amount of water has been generated in the fuel cell stack by the step of supplying power.

6. The method of claim 2, further comprising a step of monitoring a characteristic of the power supplied from the fuel cell system during the step of supplying power, wherein the step of supplying power is stopped before the predetermined maintenance hydration treatment has been completed if the step of monitoring indicates that the power supplied from the fuel cell system does not meet one or more predetermined criteria.

7. The method of claim 6, further comprising a step of repeating the steps of determining a start time, activating the fuel cell system, and supplying power if the step of supplying power is stopped before the predetermined maintenance hydration treatment has been completed.

8. The method of claim 1, wherein the step of determining a start time includes a step of determining a start time corresponding to a predetermined period of inactivity of the fuel cell system.

9. The method of claim 1, wherein the step of determining a start time includes a step of determining a start time at least in part according to a measured parameter of the fuel cell system, a measured parameter outside the fuel cell system, or both.

10. The method of claim 9, further comprising a step of measuring at least one parameter selected from the group consisting of temperature, humidity, and hydration, wherein the step of measuring at least one parameter provides the measured parameter according to which the start time is at least partially determined.

11. The method of claim 1, wherein the steps of determining a start time, activating the fuel cell system, and supplying power are performed automatically.

12. The method of claim 1, further comprising a step of adjusting the output voltage of the fuel cell system.

13. The method of claim 12, wherein the step of adjusting the output voltage includes a step of increasing the output voltage, if needed, to supply power from the fuel cell system at an output voltage that is higher than the voltage of power from the primary power source.

14. The method of claim 13, wherein the step of increasing the output voltage includes a step of increasing the output voltage (a) until the fuel cell system is generating power above a threshold level or (b) until the output voltage reaches and/or exceeds a threshold value, whichever comes first, and wherein, if the output voltage reaches and/or exceeds the threshold value first, the steps of activating the fuel cell system and increasing the output voltage are repeated one or more times until the fuel cell system is generating power above the threshold level such that the step of supplying power can be performed.

15. The method of claim 14, wherein, if the output voltage reaches and/or exceeds the threshold value, the steps of activating the fuel cell system and increasing the output voltage are repeated after waiting a predetermined time interval.

16. The method of claim 12, further comprising a step of measuring an electrical characteristic of the power from the primary power source, wherein the step of adjusting the voltage is based at least in part on the step of measuring an electrical characteristic of the power from the primary power source.

17. The method of claim 1, further comprising a step of measuring the applied load from the energy-consuming assembly before the step of activating the fuel cell system, wherein the step of activating the fuel cell system is postponed if the applied load does not meet one or more predetermined criteria.

18. A fuel cell system with maintenance hydration while serving as an auxiliary power source for an energy-consuming assembly that is disposed in electrical communication with a primary power source, the fuel cell system comprising:
   a fuel cell stack;
   a reactant delivery system for delivering at least a fuel to the fuel cell stack for generation of electrical output;
   an output circuit for conducting the electrical output to the energy-consuming assembly; and
   a controller operatively coupled to at least the reactant delivery system and the output circuit and configured to (1) determine a start time for maintenance of the fuel cell system, (2) activate the fuel cell system from an inactive condition according to the start time by initiating delivery of at least fuel to the fuel cell stack from the reactant delivery system, and (3) regulate an output voltage at which the electrical output is conducted to the energy-consuming assembly from the activated fuel cell stack such that power is supplied from the activated fuel cell system to satisfy at least a portion of an applied load from the energy-consuming assembly, wherein the power from the fuel cell system is supplied at an output voltage that is higher than a voltage at which power from the primary power source is being supplied to the energy-consuming assembly, such that the energy-consuming assembly uses, at least in part, the power from the fuel cell system instead of the power from the primary power source, thereby operating the fuel cell system for power generation and associated hydration while the primary power source is available.

19. The fuel cell system of claim 18, wherein the controller is configured to permit supplying of the power from the fuel cell system to the energy-consuming assembly for a hydration interval and then to stop the supplying of the power after completion of a predetermined maintenance hydration treatment.

20. The fuel cell system of claim 19, wherein the hydration interval corresponds to a predetermined time interval, and wherein the controller is configured to stop the supplying of power after the power from the fuel cell system has been supplied to the energy-consuming assembly for the predetermined time interval.

21. The fuel cell system of claim 19, wherein the predetermined maintenance hydration treatment corresponds to a predetermined amount of power supplied from the fuel cell system, and wherein the controller is configured to stop the supplying of the power after the predetermined amount of power has been supplied to the energy-consuming assembly from the fuel cell system.

22. The fuel cell system of claim 19, wherein the output circuit includes a sensor for monitoring a characteristic of the power supplied to the energy-consuming assembly from the fuel cell system, and wherein the controller is configured to stop the supplying of the power from the fuel cell system to the energy-consuming assembly before the predetermined maintenance hydration treatment has been completed if one or more signals from the sensor indicate that the power supplied from the fuel cell system does not meet one or more predetermined criteria.

23. The fuel cell system of claim 22, wherein the controller is configured to repeat determination of a start time, activation of the fuel cell system, and regulation of an output voltage if the controller stops the supplying of the power before the predetermined maintenance hydration treatment has been completed.

24. The fuel cell system of claim 18, wherein the output circuit includes a sensor for measuring a characteristic of the electrical output, and wherein the controller is operatively coupled to the sensor and configured to regulate the output voltage according to one or more signals received from the sensor.

25. The fuel cell system of claim 18, wherein the controller is configured to determine a start time corresponding to a predetermined period of inactivity of the fuel cell system.

26. The fuel cell system of claim 18, further comprising a sensor operatively coupled to the controller and configured to measure at least one parameter selected from the group consisting of temperature, humidity, and hydration, wherein the controller is configured to determine the start time at least in part based on one or more signals received from the sensor.

27. The fuel cell system of claim 24, wherein the controller is configured to increase the output voltage (a) until the fuel cell system is generating power above a threshold level or (b) until the output voltage reaches and/or exceeds a threshold value, whichever comes first, and wherein, if the output voltage reaches and/or exceeds the threshold value first, the controller is configured to repeat determination of a start time, activation of the fuel cell system, and adjustment of the output voltage one or more times until the fuel cell system is generating power above the threshold level.

28. The fuel cell system of claim 27, wherein the controller is configured to repeat determination of a start time, activation of the fuel cell system, and adjustment of the output voltage after waiting a predetermined time interval, if the output voltage reaches and/or exceeds the threshold value.

29. The fuel cell system of claim 19, further comprising a sensor for measuring an electrical characteristic of the power from the primary power source, wherein the controller is configured to regulate the output voltage based at least in part on one or more signals received from the sensor.

30. A fuel cell system with maintenance hydration while serving as an auxiliary power source for an energy-consuming assembly that is disposed in electrical communication with a primary power source, the fuel cell system comprising:
   a fuel cell stack;
   means for periodically supplying power from the fuel cell stack to satisfy at least a portion of an applied load from the energy-consuming assembly, wherein the power from the fuel cell system is supplied at an output voltage that is higher than a voltage at which power from the primary power source is being supplied to the energy-consuming assembly, such that the energy-consuming assembly uses, at least in part, the power from the fuel cell system instead of the power from the primary source, thereby operating the fuel cell system for power generation and associated hydration while the primary power source is available.

* * * * *